(12) United States Patent  
Varadarajan et al.

(10) Patent No.: US 9,210,171 B1
(45) Date of Patent: Dec. 8, 2015

(54) SELECTIVELY PROTECTING VALID LINKS TO PAGES OF A WEB SITE

(71) Applicant: Shape Security, Inc., Mountain View, CA (US)

(72) Inventors: Subramanian Varadarajan, San Jose, CA (US); Justin Call, Santa Clara, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

(21) Appl. No.: 14/290,805

(22) Filed: May 29, 2014

(51) Int. Cl.
*H04L 29/06* (2006.01)
*G06F 21/62* (2013.01)

(52) U.S. Cl.
CPC ............ *H04L 63/10* (2013.01); *G06F 21/6218* (2013.01)

(58) Field of Classification Search
CPC ... H04L 67/34; H04L 63/168; H04L 63/1441; H04L 63/1408; G06F 21/55
USPC ................................. 713/189; 726/22, 23, 25
See application file for complete search history.

(56) References Cited

U.S. PATENT DOCUMENTS

| | | | |
|---|---|---|---|
| 6,401,077 | B1 | 6/2002 | Godden et al. |
| 7,117,429 | B2 | 10/2006 | Vedullapalli et al. |
| 7,464,326 | B2 * | 12/2008 | Kawai et al. ................. 715/205 |
| 7,500,099 | B1 | 3/2009 | McElwee et al. |
| 7,707,223 | B2 | 4/2010 | Zubenko |
| 7,895,653 | B2 * | 2/2011 | Calo et al. ....................... 726/23 |
| 8,020,193 | B2 | 9/2011 | Bhola et al. |
| 8,086,957 | B2 | 12/2011 | Bauchot et al. |

(Continued)

FOREIGN PATENT DOCUMENTS

| | | |
|---|---|---|
| CN | 101471818 A | 7/2009 |
| CN | 101471818 | 5/2011 |
| GB | 2443093 A | 4/2008 |
| WO | WO9964967 A1 | 12/1999 |
| WO | WO02088951 A1 | 11/2002 |
| WO | WO2004109532 A1 | 12/2004 |
| WO | WO2008095018 A2 | 8/2008 |

(Continued)

OTHER PUBLICATIONS

RSA, "RSA Offers Advanced Solutions to Help Combat Man-In-The-Browser Attacks," rsa.com [online] May 18, 2010 [captured Nov. 11, 2011].

(Continued)

*Primary Examiner* — Saleh Najjar
*Assistant Examiner* — Oleg Korsak
(74) *Attorney, Agent, or Firm* — Hickman Palermo Becker Bingham LLP

(57) ABSTRACT

In an embodiment, a method comprises intercepting, using a server computer, a first set of instructions that define a user interface and a plurality of links, wherein each link in the plurality of links is associated with a target page, and the plurality of links includes a first link; determining that the first link, which references a first target page, is protected; in response to determining the first link is protected: generating a first protected link that is different than the first link and includes first data that authenticates a first request that has been generated based on the first protected link and that references the first target page; and generating a first decoy link that includes second data that references a first decoy page and not the first target page; rendering a second set of instructions comprising the first protected link and the first decoy link, but not the first link, and which is configured to cause a first client computer to present the first protected link in the user interface and hide the first decoy link from the user interface; sending the second set of instructions to the first client computer.

30 Claims, 6 Drawing Sheets

(56) References Cited

U.S. PATENT DOCUMENTS

| | | | |
|---|---|---|---|
| 8,225,401 B2 | 7/2012 | Sobel et al. | |
| 8,266,202 B1 | 9/2012 | Colton et al. | |
| 8,266,243 B1 | 9/2012 | Carlson et al. | |
| 8,332,952 B2 | 12/2012 | Zhang et al. | |
| 8,347,396 B2 * | 1/2013 | Grigsby et al. | 726/26 |
| 8,392,576 B1 * | 3/2013 | Henderson | 709/226 |
| 8,516,080 B2 | 8/2013 | Chow et al. | |
| 8,527,774 B2 | 9/2013 | Fallows et al. | |
| 8,533,480 B2 | 9/2013 | Pravetz et al. | |
| 8,555,385 B1 | 10/2013 | Bhatkar et al. | |
| 8,555,388 B1 | 10/2013 | Wang et al. | |
| 8,627,479 B2 | 1/2014 | Wittenstein et al. | |
| 2002/0188631 A1 | 12/2002 | Tiemann et al. | |
| 2004/0245525 A1 | 12/2004 | Yamazaki et al. | |
| 2006/0031855 A1 | 2/2006 | Smithline et al. | |
| 2007/0011295 A1 | 1/2007 | Hansen | |
| 2008/0222736 A1 | 9/2008 | Boodaei et al. | |
| 2008/0320586 A1 | 12/2008 | Hrabik et al. | |
| 2009/0007243 A1 | 1/2009 | Boodaei et al. | |
| 2009/0099988 A1 | 4/2009 | Stokes et al. | |
| 2009/0193513 A1 | 7/2009 | Agarwal et al. | |
| 2009/0241174 A1 | 9/2009 | Rajan et al. | |
| 2009/0292984 A1 | 11/2009 | Bauchot et al. | |
| 2010/0100927 A1 | 4/2010 | Bhola et al. | |
| 2010/0115594 A1 | 5/2010 | Paya et al. | |
| 2010/0186089 A1 | 7/2010 | Fu et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2010/0262780 A1 | 10/2010 | Mahan et al. | |
| 2010/0287132 A1 | 11/2010 | Hauser | |
| 2011/0047169 A1 | 2/2011 | Leighton et al. | |
| 2011/0107077 A1 | 5/2011 | Henderson et al. | |
| 2011/0131416 A1 | 6/2011 | Schneider | |
| 2011/0154021 A1 | 6/2011 | McCann et al. | |
| 2011/0178973 A1 | 7/2011 | Lopez et al. | |
| 2011/0239113 A1 * | 9/2011 | Hung et al. | 715/271 |
| 2011/0283110 A1 | 11/2011 | Dapkus et al. | |
| 2011/0296391 A1 | 12/2011 | Gass et al. | |
| 2011/0302623 A1 | 12/2011 | Ricci | |
| 2011/0320816 A1 | 12/2011 | Yao et al. | |
| 2012/0011262 A1 | 1/2012 | Cheng et al. | |
| 2012/0022942 A1 | 1/2012 | Holloway et al. | |
| 2012/0023394 A1 | 1/2012 | Pieczul et al. | |
| 2012/0059742 A1 | 3/2012 | Katzin et al. | |
| 2012/0096116 A1 | 4/2012 | Mislove et al. | |
| 2012/0117649 A1 * | 5/2012 | Holloway et al. | 726/24 |
| 2012/0124372 A1 * | 5/2012 | Dilley et al. | 713/162 |
| 2012/0173870 A1 | 7/2012 | Reddy et al. | |
| 2012/0198528 A1 | 8/2012 | Baumhof | |
| 2012/0216251 A1 | 8/2012 | Kumar et al. | |
| 2013/0091582 A1 | 4/2013 | Chen et al. | |
| 2013/0198607 A1 | 8/2013 | Mischook et al. | |
| 2013/0219256 A1 | 8/2013 | Lloyd et al. | |
| 2013/0219492 A1 | 8/2013 | Call et al. | |
| 2013/0227397 A1 | 8/2013 | Tvorun et al. | |
| 2013/0232234 A1 * | 9/2013 | Kapur et al. | 709/219 |
| 2013/0263264 A1 | 10/2013 | Klein et al. | |
| 2013/0340043 A1 | 12/2013 | Zarei et al. | |
| 2014/0040787 A1 | 2/2014 | Mills et al. | |
| 2014/0053059 A1 | 2/2014 | Weber et al. | |
| 2014/0089786 A1 | 3/2014 | Hashmi | |

FOREIGN PATENT DOCUMENTS

| | | | |
|---|---|---|---|
| WO | WO2008095031 A1 | 8/2008 | |
| WO | WO2008130946 A2 | 10/2008 | |
| WO | WO2013091709 A1 | 6/2013 | |

OTHER PUBLICATIONS

CodeSealer, "CodeSealer," codesealer.com [online] 2013 [captured Aug. 29, 2013]. Retrieved from the Internet: codesealer.com/technology.html.

Cova et al., "Detection and Analysis of Drive-by-Download Attacks and Malicious JavaScript Code," World Wide Web Conference Committee, Apr. 26-30, 2010.

Egele et al., Defending Browsers against Drive-by Downloads: Mitigating Heap-spraying Code Injection Attacks.

Entrust, "Defeating Man-in-the-Browser Malware," Entrust.com [online] Sep. 2012 [retrieved Oct. 15, 2013]. Retrieved from the Internet: Entrust.com.

Google Search, "Google Patents Search Results" dated May 21, 2014, 2 pages.

IP.com, "Search Results", Patents and Applications, http://ip/com/search/results.html, dated May 6, 2014, 2 pages.

Krebs on Security, In-depth security news and investigation, "A Closer Look at Rapport from Trusteer", dated Apr. 29, 2010.

Anderson et al., "Measuring the Cost of Cybercrime," 2012 Workshop on the Economics of Information Security (WEIS), [retrieved on Oct. 15, 2013].

Oh, "Recent Java exploitation trends and malware," Black Hat USA 2012, Retrieved from the Internet: microsoft.com.

Vasco, "Hardened Browser," vasco.com [online] [retrived on Oct. 15, 2013]. Retrieved from the Internet: <URL: http://www.vasco.com/products/client_products/pki_digipass/hardened_browser.aspx>, 2 pages.

Rutkowska, "Rootkits vs. Stealth by Design Malware," Black Hat Europe, 2006. Retrieved from the Internet: invisiblethings.org.

SafeNet, "Prevent Financial Fraud and Man-in-the Browser Attacks," safenet-inc.com [online] [retrieved on Oct. 15, 2013].

Sood and Enbody, "A Browser Malware Taxonomy," Virus Bulletin, Jun. 2011. Retrieved from the Internet: <URL:http://www.secniche.org/released/VB_BRW_TAX_AKS_RJE.pdf>, 5 pages.

Sood and Enbody, "Browser Exploit Packs—Exploitation Tactics," Virus Bulletin Conference, Oct. 2011, Retrieved from the Internet: www.virusbin.com.

Sood et al., "The Art of Stealing Banking Information—Form grabbing on Fire," Virus Bulletin, Nov. 2011, Retrieved from the Internet: www.virusbin.com.

Team Cymru, "Cybercrime—an Epidemic," Queue, 4(9):24-25, Nov. 2006, Retrieved from the Internet: www.acmqueue.com.

Trusteer, "Trusteer Rapport", "Endpoint-centric Fraud Prevention", from the web http://www.trusteer.com/products/trusteer-rapport, last accessed on Ja. 9, 2013, 2 pages.

Marcus and Sherstobitoff, "Dissecting Operation High Roller," McAfee [online] 2012 [retrieved on Oct. 15, 2013]. Retrieved from the Internet: www.mcafee.com.

USPTO, Office Action in U.S. Appl. No. 14/286,733, notified Jul. 14, 2014, 17 pages.

Rieck et al., "Cujo: Efficient Detection and Prevention of Drive-by-Download Attacks", ACSAC, Dated Dec. 2010, 9 pages.

Pattabiraman et al., "DoDOM: Leveraging DOM Invariants for Web 2.0 Application Robustness Testing" dated 2010, IEEE, 10 pages.

International Searching Authority, "Search Report" in application No. PCT/US2014/024232, dated Aug. 1, 2014, 52 pages.

International Searching Authority, "Search Report" in application No. PCT/2014/027805, dated Aug. 18, 2014, 14 pages.

International Searching Authority, "Search Report" in application No. PCT/2014/023897, dated Jul. 18, 2014, 15 pages.

H. Krawczyk, "HMAC-Based Extract-And-Expand Key Derivation Function, (HKDF)", RFC 5869, IETF, May 2010, 10 pages.

Dougan et al., International Journal of Ambient Computing and Intelligence, dated Jan.-Mar. 2012, pp. 29-39.

D. Kristol, "HTTP State Management Mechanism", RFC 2965, IETF, dated Oct. 2000, 19 pages.

Currie et al., In-the-Wire Authentication: Protecting Client-Side Critical Data Fileds in Secure Network Transactions, dated 2009 2nd International Con. Adapt. Science & Tech. IEEE, pp. 232-237.

International Searching Authority, "Search Report" in application No. PCT/2014/027805, dated Aug. 14, 2014, 14 pages.

International Searching Authority, "Search Report" in application No. PCT/US15/32060, dated Aug. 25, 2015, 10 pages.

* cited by examiner

SELECTIVELY PROTECTING VALID LINKS TO PAGES OF A WEB SITE

FIELD OF THE DISCLOSURE

The present disclosure generally relates to security techniques applicable to client/server systems, and relates more specifically to selectively protecting links to pages of a web site and determining whether to respond with the requested page or a decoy page. SUGGESTED GROUP ART UNIT: 2447; SUGGESTED CLASSIFICATION: 709/217.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web sites are typically comprised of a plurality of inter-linking web pages, each containing public and proprietary content to be presented to a user. Proprietary content may include content created by a web site administrator, content provider, and/or user. Proprietary content may include private, sensitive, and/or personally identifying information about a person and/or entity.

A user may traverse through web pages in a web site by selecting links on various web pages. For example, on a social networking web site, a user may select a link to a first friend's profile page to see content related to the first friend. The first friend's profile page may contain a link to a second friend, and the user may select that link to view the second friend's profile page.

Unfortunately, fraudsters, spammers, data miners, and others may use bots to traverse web sites and collect the proprietary content presented in each page. A bot may be a computer and/or software executed by a computer that automates making requests for page and storing data in the returned pages. For example, a bot may be a web scraper, web crawler, automatic web browser, and/or any other tool designed to submit and/or receive data from one or more web servers autonomously and/or automatically. A bot may comprise complex logic designed to respond to data received from one or more web servers.

Malicious users may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, and stack fingerprinting attacks. As a specific example, a fraudster may cause a bot to traverse through pages of a web site and collect data, such as who is connected with whom on a particular social networking web site. In the current example, the bot may generate a social graph, following links from one person's profile page to a connected, second person's profile page. The bot may also collect personal information from each person's profile page.

Some web crawlers, however, are not malicious. For example, search engines use web crawlers to find and index web pages on the Internet. An administrator of a web site may want search engines to index and link to various public pages on the web site. For example, an administrator of a web site may want web crawlers to find and index the web site's home page, help page, press release page, and/or other public pages.

An administrator may wish to prevent malicious users from attacking the site, while allowing legitimate users and search engines full and/or partial access to both public and/or proprietary data. However, determining whether the request for a page is a legitimate request or malicious attack may be difficult.

SUMMARY

The appended claims may serve as a summary of the invention.

DETAILED DESCRIPTION

Figure 1:
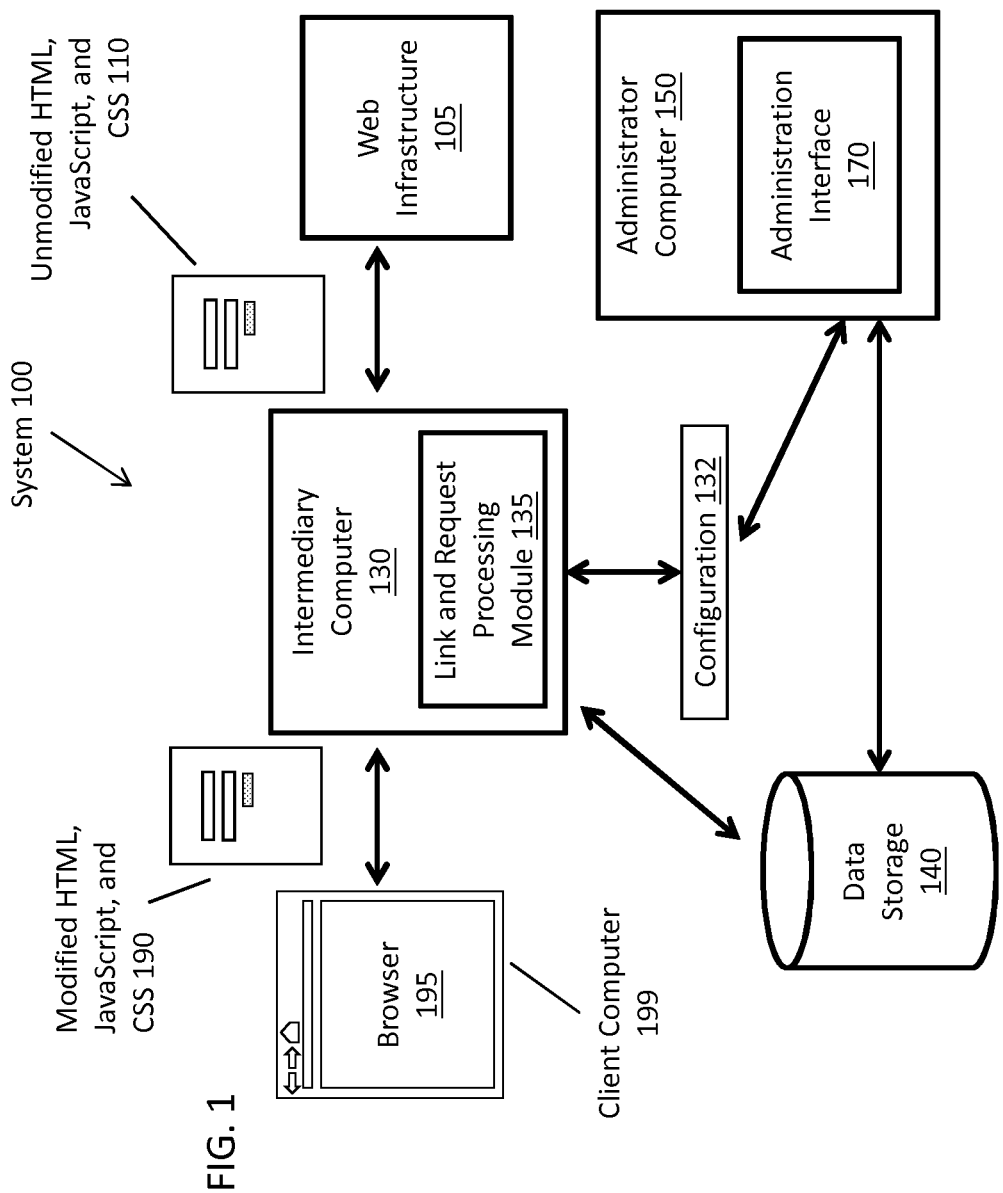
FIG. 1 illustrates a system comprising a server security system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Example Network Topology
        2.1 Browser
            2.1.1 Objects
            2.1.2 Links
            2.1.3 Protected Links
            2.1.4 Decoy Links
            2.1.5 Decoy Pages
            2.1.6 Differences Between a Browser and a Bot
        2.2 Web Infrastructure
        2.3 Intermediary
        2.4 Administrator computer
    3.0 Process Overview
        3.1 Generating a Protected Link in a Source Web Page
            3.1.1 Generating a Protected Link using a State-based Intermediary
            3.1.2 Generating a Protected Link using a Stateless Intermediary 3.2 Generating a Decoy Link
3.3 Rendering and Sending a Second Set of Instructions to the Client
3.4 Determining whether a Request for a Target Page is Valid
  3.4.1 Determining whether a Request is Valid using a State-based Intermediary
  3.4.2 Determining whether a Request is Valid using a Stateless Intermediary
3.5 Responding to the Request
3.6 Including Additional Decoy Links or Decoy Data Structures
3.7 Building a Site Map and Selecting Links to Protect
  3.7.1 Routing a Request From a First Link to a Second Link
  3.7.2 Setting Default Behaviors
  3.7.3 Deleting Link Mappings
4.0 Implementation Mechanisms—Hardware Overview
5.0 Other Aspects of Disclosure 1.0 General Overview In an embodiment, a method comprises intercepting, using a server computer, a first set of instructions that define a user interface and a plurality of links, wherein each link in the plurality of links is associated with a target page, and the plurality of links includes a first link; determining that the first link, which references a first target page, is protected; in response to determining the first link is protected: generating a first protected link that is different than the first link and includes first data that authenticates a first request that has been generated based on the first protected link and that references the first target page; and generating a first decoy link that includes second data that references a first decoy page and not the first target page; rendering a second set of instructions comprising the first protected link and the first decoy link, but not the first link, and which is configured to cause a first client computer to present the first protected link in the user interface and hide the first decoy link from the user interface; sending the second set of instructions to the first client computer.

In an embodiment, the method comprises intercepting, from the server computer, a third set of instructions that define the first link; determining that the first link is protected; in response to determining the first link is protected: generating a second protected link, wherein the second protected link is different than the first link and the first protected link, and includes third data that authenticates a second request that has been generated based on the second protected link and that references the first target page; generating a second decoy link that includes data that references a second decoy page and not the first target page; rendering a fourth set of instructions comprising the second protected link and the second decoy link, but neither the first link nor the first protected link, and which is configured to cause the first client computer to present the second protected link in the user interface; and hide the second decoy link from the user interface; sending the fourth set of instructions to the first client computer.

In an embodiment, the method comprises receiving, from the first client computer, a second request indicating that the first decoy link was selected; in response to determining the first decoy link was selected, generating a decoy page with one or more decoy links, which when selected generate an additional request for an additional decoy page with one or more additional decoy links; sending, to the first client computer, the decoy page.

In an embodiment, the method comprises generating the first protected link, wherein the first protected link includes a key; storing the key indicating that the key is valid; receiving, from the first client computer, the first request with the key indicating the first protected link was selected; determining the key is valid; in response to determining the key is valid, sending a second request to the server computer for a set of valid data to generate the first target page; generating the first target page with the set of valid data.

In an embodiment, the method comprises encrypting one or more requirements to produce an encrypted set of requirements, which identify a particular page from which the first protected link is valid; generating the first protected link including the encrypted set of requirements; receiving, from the first client computer, the first request with the encrypted set of requirements and identifying a previous page from which the first link was selected; decrypting the encrypted set of requirements; determining the particular page is the previous page; in response to determining the particular page is the previous page, sending a second request to the server computer for a set of valid data to generate the first target page; generating the first target page with the set of valid data; sending the first target page to the first client computer.

In an embodiment, the method comprises receiving a plurality of source pages, wherein each source page comprises a set of instructions, each set of instructions includes one or more links, and each link in the one or more links references a targeted page; storing, for each link in each source page of the plurality of source pages, a link mapping between the link on the source page and the targeted page that the link references; presenting one or more link mappings in an administration interface to an administrator; receiving, through the administration interface, one or more inputs designating a particular link from a particular source page to a particular targeted page as protected, wherein the particular link has a particular link identifier; determining a first link identifier for the first link; determining the first link is protected by determining that the first link identifier matches the particular link identifier.

While each of the drawing figures illustrates a particular embodiment for purposes of illustrating a clear example, other embodiments may omit, add to, reorder, and/or modify any of the elements shown in the drawing figures. Furthermore, while the instructions discussed in each example embodiment are HTML and JavaScript instructions, in other embodiments, the instructions intercepted and generated by the intermediary computer need not be HTML and/or JavaScript instructions.

2.0 Example Network Topology

Modifying instructions sent from a web infrastructure, which comprises one or more web servers, to a browser may prevent, and/or reduce the effectiveness of, one or more various attacks, such as content scraping, ratings manipulation, fake account creation, reserving rival goods attacks, ballot stuffing attacks, web site scraping attacks, vulnerability assessments, stack fingerprinting attacks, and/or other attacks. For example, each time a web page is requested, such as an account creation page, order page, voting page, and/or other page from a web server computer, an intermediary computer may intercept the requested page sent from the web infrastructure. The intermediary may transform the page, and/or the page's instructions, to produce a new set of instructions which include various security measures. The intermediary may send the page with the new set of instructions to the browser that requested the web page.

Each time the intermediary intercepts instructions from a server computer, the intermediary may generate new, different instructions to send to the browser. Thus, a bot requesting the same page over and over may receive a different set of instructions after each request and may not observe the same instructions twice. Without receiving the same instructions with the same identifiers, the bot may be incapable of determining what link(s) should be selected.

FIG. 1 illustrates a system comprising a server security system, in an example embodiment. System 100 includes web infrastructure 105, client computer 199, intermediary computer 130, data storage 140, and administrator computer 150 distributed across a plurality of interconnected networks. While each of the components listed above are illustrated as if running on a separate, remote computer from each other, one or more of the components listed above may be part of and/or executed on the same computer. For example, intermediary computer 130, data storage 140, web infrastructure 105, and/or administrator computer 150 may be executed on the same computer, local area network, and/or wide area network. Additionally or alternatively, intermediary computer 130 is a proxy server for web infrastructure 105. Additionally or alternatively, intermediary computer 130 may be hardware and/or software that are physically and/or logically positioned between a router and web infrastructure 105, such that requests and/or data sent to, and/or sent from, web infrastructure 105 over one or more protocols may be intercepted by intermediary computer 130. For example, intermediary computer 130 may be a software module that is executed by a web server in web infrastructure 105.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

2.1 Browser

A browser may be one or more computer programs or other software elements stored in electronic digital memory and executed on a computer that receives instructions from a server computer, performs one or more of the received instructions, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a standalone, web-based, and/or mobile application as part of a web view, and/or web view controller, to send and/or receive data over HTTP, SPDY, and/or other protocol(s). A user may use a browser to send data to a server computer. The server computer may respond with additional instructions.

Browser 195 may be a browser that is executed on client computer 199. Additionally or alternatively, browser 195 may be a browser operated by a user using client computer 199. Browser 195 may be configured to request, receive, and/or execute data from web infrastructure 105. For example, browser 195 may request, receive, and/or execute a web page comprising HTML, CSS, and/or JavaScript which define one or more links, and which when executed cause the web page to be displayed. In one or more examples herein, browser 195 may be a bot.

Browser 195 may also be configured to request data from web infrastructure 105 based on one or more links. For example, in response to a user selecting a link, browser 195 may request the page referenced by the link (the "target page"). The request may include data included in the link and/or in other parts of the page. Alternatively, browser 195 may be a bot that is configured to traverse the web page and request the target page(s) of one or more links in a web page.

A page or web page may be a set of instructions that define one or more objects and/or operations that may be executed concurrently and may be visually displayed together. For example, in response to a request from a client computer, a "home page" may be sent to the client computer. The home page may be a set of instructions that a web server sends to a remote client computer if no parameters are included in the request. One page may reference and/or include other pages. For example, in response to a user selecting a link in a current page through a browser, the browser may request and receive a partial page. The partial page may be displayed in the interface currently displayed and defined by the current page.

2.1.1 Objects

An object may be a data structure that can be identified by an identifier and/or a relationship with another object, such as a link, form, button, image, field, input, and/or sub-page. For example, an object may have a unique identifier, which can be used to reference the object. An object may also be referenced by its position in a hierarchy of object.

An object may have one or more identifiers. For example, a link may be identified by a particular attribute in the link, such as a "name", "id", or "class" attribute. A link may be identified by an object that includes the link. For example, each link a division or section of a page may be identified by the division or section's identifier. Also for example, each link in a source page may be identified by the identifier for the source page, such as the URL of the source page. One or more links may be identified by a target page. For example, each link in any page may be identified by the target page that the link points to. Additionally or alternatively, links may be identified by a combination of identifiers.

An attribute may be data that identifies and/or describes the appearance, behavior, and/or content of an object. For example, an attribute may be a unique identifier, such as a name. An attribute may indicate that an object is a type of text field, text area, checkbox, and/or radio button. Other attributes may define or describe dimension, position, color, visibility, value, and any other functional or visual aspect of an object.

2.1.2 Links

A link may be an object that references a page or web page. The page referenced by the link may be referred to as a target page. A link may reference a target page by including a URL and/or other data that identifies a target page. A link may comprise one or more parameters. Additionally or alternatively, a link may comprise logic and/or instructions that are executed when the link is selected. Additionally or alternatively, a link may comprise and/or reference one or more objects that gather data and submit the data to a web server. For example, a link may reference a form. After data is entered into the form, and the link is selected, a request for a target page may be sent and the data in the form may be submitted with the request. The target page may comprise an error and/or success code. A target page need not include HTML, CSS, and JavaScript. Also for example, a link may comprise a form that references a target page. After data is entered into the form, and a submit button is selected, a request for the target page may be sent and the data in the form may be submitted with the request.

A link may be included in a page. The page the link is included in may be referred to as the source page. Additionally or alternatively, a link may be included in a short messaging service "text" message, instant message, email, and/or other medium.

2.1.3 Protected Links

A protected link may be a link that includes data that an intermediary computer may use to verify that a request from a client computer was generated from a valid link selected by a legitimate user. In response to verifying that a request was generated from a valid link selected by a legitimate user, the intermediary computer may send the client computer the link's target page. However, in response to determining that a request was not generated from a valid link selected by a legitimate user, the intermediary computer may send the client computer a decoy page.

2.1.4 Decoy Links

A decoy link may be a link that does not include data that an intermediary computer may use to verify that a request from a client computer was generated from a valid link selected by a legitimate user. Additionally or alternatively, a decoy link may be a link that includes data that an intermediary may use to determine that a request was generated by a bot, malicious user, program, and/or not a by a legitimate user. In response to receiving a request based on a decoy link, the intermediary may respond with a decoy page. Decoy links may be termed bogus links or false links.

Decoy links need not be visible to a user using a web browser. For example, a decoy link may be associated with a "display" attribute that is set to false or zero, a "height" and/or "width" attribute that is set to zero, a location that is outside the visible bounds of the object the decoy link is in, and/or one or more other attributes associated with the link that instructs a browser not to display the decoy link to the user. Additionally or alternatively, a decoy link may be included in one or more objects that have one or more attributes associated with the object that instructs a browser not to display the object and/or the decoy link in the object to the user.

As discussed in detail herein, to prevent attacks and/or discourage future attacks, an administrator may use one or more of the methods and/or systems described herein to insert one or more decoy links to be inserted into a page, which reference one or more decoy pages. For example, if a bot merely generates requests based on links within a page, and does not render a page and select a link based on which link(s) are visible, then the bot may select a decoy link to generate a request from. In contrast, a user, which selects links rendered on a display, may not be presented with decoy link and therefore may not select a decoy link to generate a request from.

2.1.5 Decoy Pages

A decoy page may have false information and/or additional decoy links that link to additional decoy pages. A decoy page may be generated by an intermediary computer in response to receiving a request based on a decoy link and/or a protected link that is not successfully validated. Additionally or alternatively, decoy pages may be cached and server by the intermediary in response to receiving a request based on a decoy link and/or a protected link that is not successfully validated. Decoy pages may be termed bogus pages or false pages.

A decoy page may have legitimate data. For example, a decoy page for a user profile may have the user's actual name, but the personal information may be false.

2.1.6 Differences Between a Browser and a Bot

A web browser may be a tool through which application programs can provide client computers with content in a dynamic, custom user interface ("UI"). For example, in response to receiving a request for data from a web browser, a web server responds with a set of instructions and/or data comprising a web page. The instructions may define one or more objects that include data and/or other objects. The instructions may also define how the data and/or objects may be presented in a UI to enable and/or facilitate human/computer interaction.

In contrast, bots traverse web pages and/or web sites to retrieve data from, and/or submit data to, one or more web servers with little, if any, human/computer interaction. For example, in response to receiving a request for data from a bot, a web server responds with a set of instructions comprising a web page. As discussed above, the instructions may define one or more objects that include data and/or other objects. The instructions may also define how the data and/or objects may be presented in a UI. However, a malicious bot may merely parse a one or more of the instructions looking for data to store and/or use to make subsequent requests. A bot need not execute the instructions because the bot is built to operate with little, if any, human/computer interaction. A bot need not present a user with any UI defined by the one or more instructions. The bot may simply look for data by parsing one or more of the instructions looking for one or more data structures defined in the instructions. Thus, a bot may incorrectly assume that a user may select any link in a web page, including a decoy link.

2.2 Web Infrastructure

Web infrastructure 105 may be one or more server computers that receive requests for data from users, such as a user using browser 195, through intermediary computer 130. For example, web infrastructure 105 may be one or more web servers serving web pages for a particular web site. In response to a request for a web page, web infrastructure 105 may send the requested page to browser 195, through intermediary computer 130. As illustrated in FIG. 1 the data sent from web infrastructure 105 may include instructions, such as HTML, JavaScript, and CSS 110.

Instructions may mean one or more codes that define one or more objects and/or one or more operations. For example, instructions may comprise HyperText Markup Language ("HTML"), eXtensible Markup Language ("XML"), cascading style sheets ("CSS"), JavaScript, and/or any other standard or proprietary languages or codes that define objects, attributes, relationships between objects, and/or operations.

2.3 Intermediary Computer

Intermediary computer 130 may intercept instructions sent from web infrastructure 105, replace one or more links with one or more protected links, and/or insert one or more decoy links. Intermediary computer 130 may intercept one or more requests from browser 195, determine whether a request is based on a valid link or an invalid link. A request based on a valid link may be a request based on a public link and/or a valid protected link. A request based on an invalid link may be a request based on a decoy link and/or a protected link that fails one or more validations. In response to determining a request is based on a valid link, the intermediary computer 130 may forward and/or modify the request from browser 195 to web infrastructure 105. Otherwise, intermediary computer 130 may generate and respond to browser 195 with a decoy page.

Intermediary computer 130 may generate a site map that describes how a collection of pages are interconnected through one or more links in each page. As discussed herein, intermediary computer 130 may generate the site map based on the pages intermediary computer 130 intercepts from web infrastructure 105. Intermediary computer 130 may use configuration 132 and the site map to determine which links should be protected. Intermediary computer 130 may store a site map in data storage 140.

For purposes of illustrating a clear example, intermediary computer 130 is discussed herein as if a separate computer performing one or more operations. However, in an embodiment, intermediary computer 130 comprises one or more software modules, such as link and request processing module 135. The one or more software modules, such as link and request processing module 135, may perform one or more methods discussed herein with respect intermediary computer 130. The modules may be on a separate computer from web infrastructure 105 and/or administrator computer 150 as illustrated in FIG. 1. Additionally or alternatively, the modules may be executed on the same computer(s) as web infrastructure 105 and/or administrator computer 150.

Figure 6:
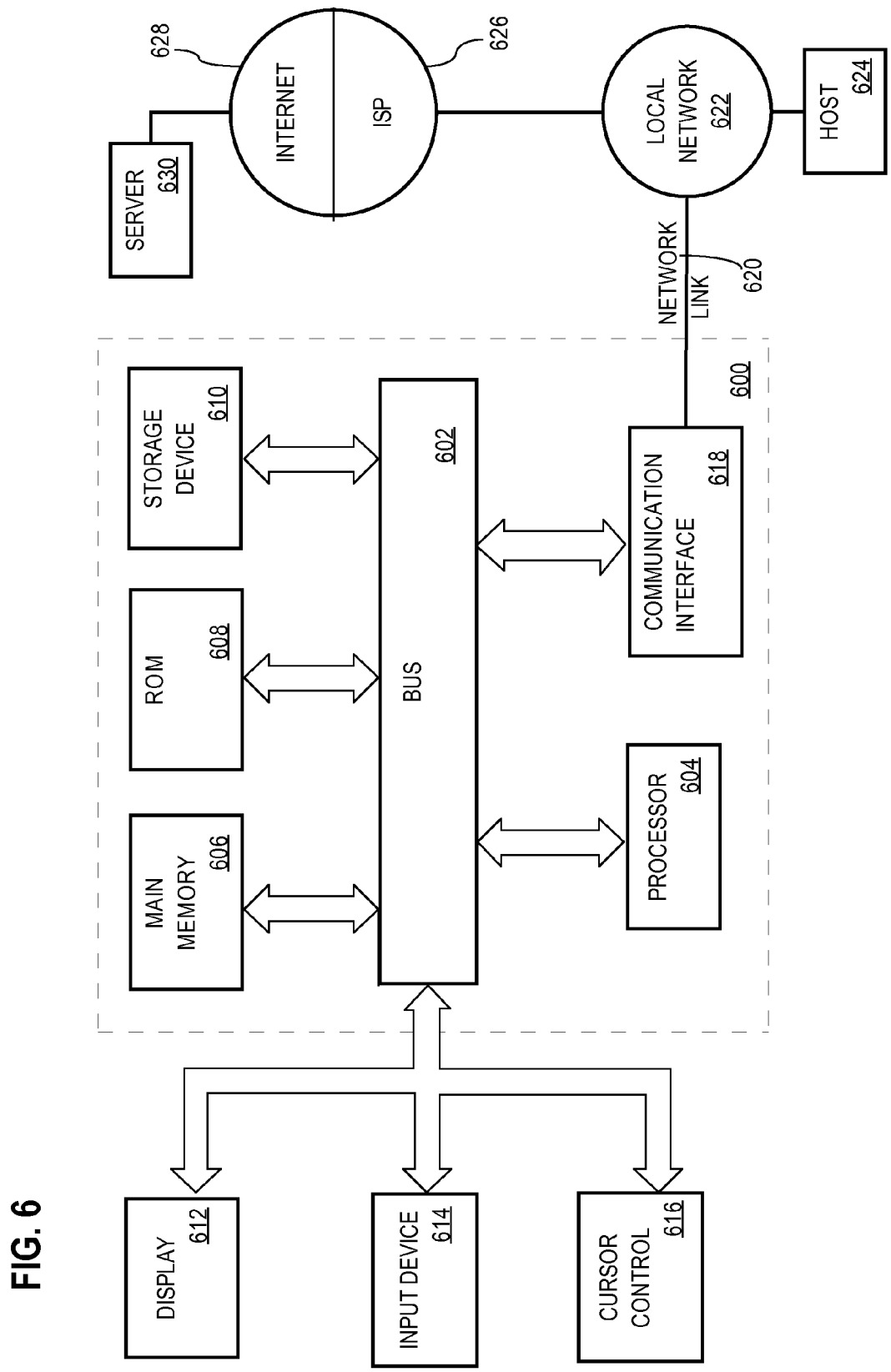
FIG. 6 is a block diagram that illustrates a computer system 600 upon which an embodiment of the invention may be implemented.

In an embodiment, each of the functional units of intermediary computer 130 and/or link and request processing module 135 may be implemented using any of the techniques further described herein in connection with FIG. 6; for example, the intermediary computer 130 may comprise a general-purpose computer configured with one or more stored programs which when executed cause performing the functions described herein for the intermediary computer, or a special-purpose computer with digital logic that is configured to execute the functions, or digital logic that is used in other computing devices.

2.4 Administrator Computer

Administrator computer 150 broadly represents any computer that may be used to manage, control, monitor or otherwise administrate a web site or a set of web pages. The particular role of a user of the computer is not critical and the label "administrator" is used here merely for convenience to illustrate a clear example. A user, such as an administrator for web infrastructure 105, may use administrator computer 150 to retrieve data from data storage 140. For example, administrator computer 150 may display a site map stored in data storage 140 through administration interface 170.

Administration interface 170 may present a site map with links from source pages to target pages. Administration interface 170 may also present which links and/or target pages are protected, as defined in configuration 132. Administration interface 170 may also provide controls for a user to change the status of a link and/or target page from public to protected, or from protected to public. Thus, a user, through administrator computer 150, may modify configuration 132 based on the site map displayed. Intermediary computer 130 may change which links are protected based on the modified configuration 132.

3.0 Process Overview

An intermediary may remove links from a web page, replace one or more links with one or more protected links, insert decoy links. The intermediary may include one or more instructions in a web page to hide, and/or otherwise prevent a user from selecting, the decoy links. Thus, a user using the browser may not select a decoy link because the decoy link is not visible and/or is not selectable. However, a bot, which does not parse and/or execute the one or more instructions, and/or does not determine which links may be visible to a user using a browser, may select one or more decoy links and/or invalid links.

A legitimate bot may avoid selecting decoy links based on data indicating whether a page is public and/or protected. For example, a web site may have a "robots.txt" file that includes data indicating which URL(s), path(s), web page(s), and/or any other web page identifier(s) correspond to one or more web pages that are public and/or protected. The intermediary need not generate decoy links to pages that are public and/or not protected. Therefore, a legitimate bot may download the robots.txt file and may traverse each public page selecting one or more links that identify one or more target pages deemed to be public and/or not protected based on the robots.txt file. In contrast, a malicious bot, which does not adhere to the data in the robots.txt file, may attempt to select one or more links, including one or more decoy links and/or one or more invalid links, that identify one or more target pages deemed to be protected and/or not public based on the robots.txt file. Thus, a legitimate browser may traverse the public pages without selecting one or more decoy links, whereas the malicious bot may select the one or more decoy links and/or one or more invalid links.

Figure 2:
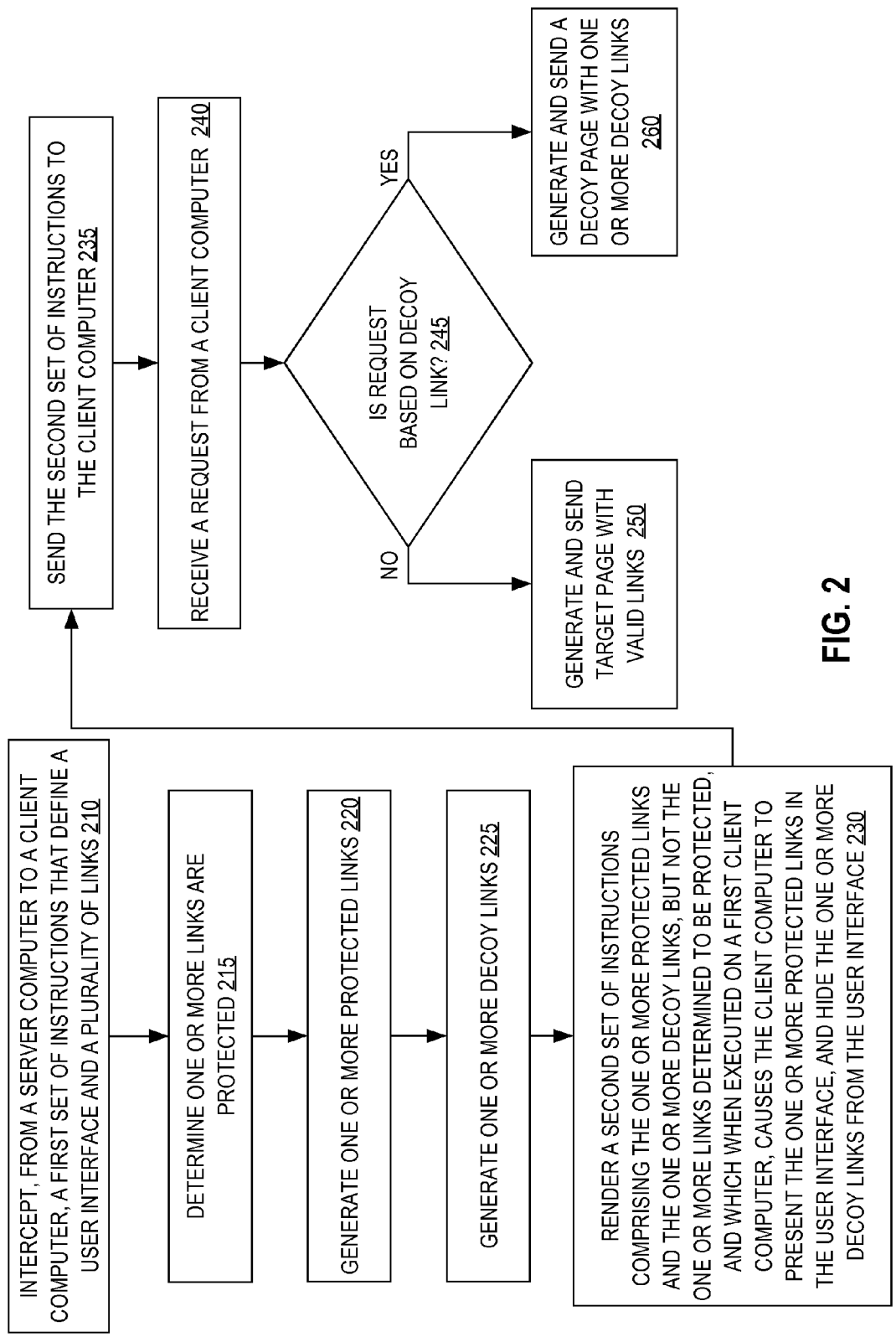
FIG. 2 illustrates a process for intercepting a page from a server computer, replacing one or more links with protected links, inserting one or more decoy links, and determining whether to respond to a subsequent request with the target page or a decoy page, in an example embodiment.

FIG. 2 illustrates a process for intercepting a page from a server computer, replacing one or more links with protected links, inserting one or more decoy links, and determining whether to respond to a subsequent request with the target page or a decoy page, in an example embodiment. In step 210, an intermediary computer intercepts, from a server computer to a client computer, a first set of instructions that define a user interface and a plurality of links. For example, intermediary computer 130 may intercept a page from web infrastructure 105 comprising unmodified HTML, JavaScript, and CSS 110.

In step 215, the intermediary computer determines one or more links that are protected. For purposes of illustrating a clear example, assume that configuration 132 indicates that one or more links with one or more identifiers should be protected. Intermediary computer 130 may traverse the source web page and select the one or more links with the one or more identifiers.

In an embodiment, intermediary computer 130 parses and/or executes the instructions received in step 210 and generates in-memory objects that represent one or more links in the page. Intermediary computer 130 may select one or more in-memory objects that correspond to one or more links identified in configuration 132.

3.1 Generating a Protected Link in a Source Web Page

In step 220, the intermediary computer may generate one or more protected links. "Generating a link" may mean creating a data structure in memory that corresponds with a link that is, and/or will be, in a page. For purposes of illustrating a clear example, assume that intermediary computer 130 selects a link in step 215 from the source page intercepted in step 210. Intermediary computer 130 may generate a protected link that will replace the link selected in step 215.

3.1.1 Generating a Protected Link Using a State-Based Intermediary

Figure 3:
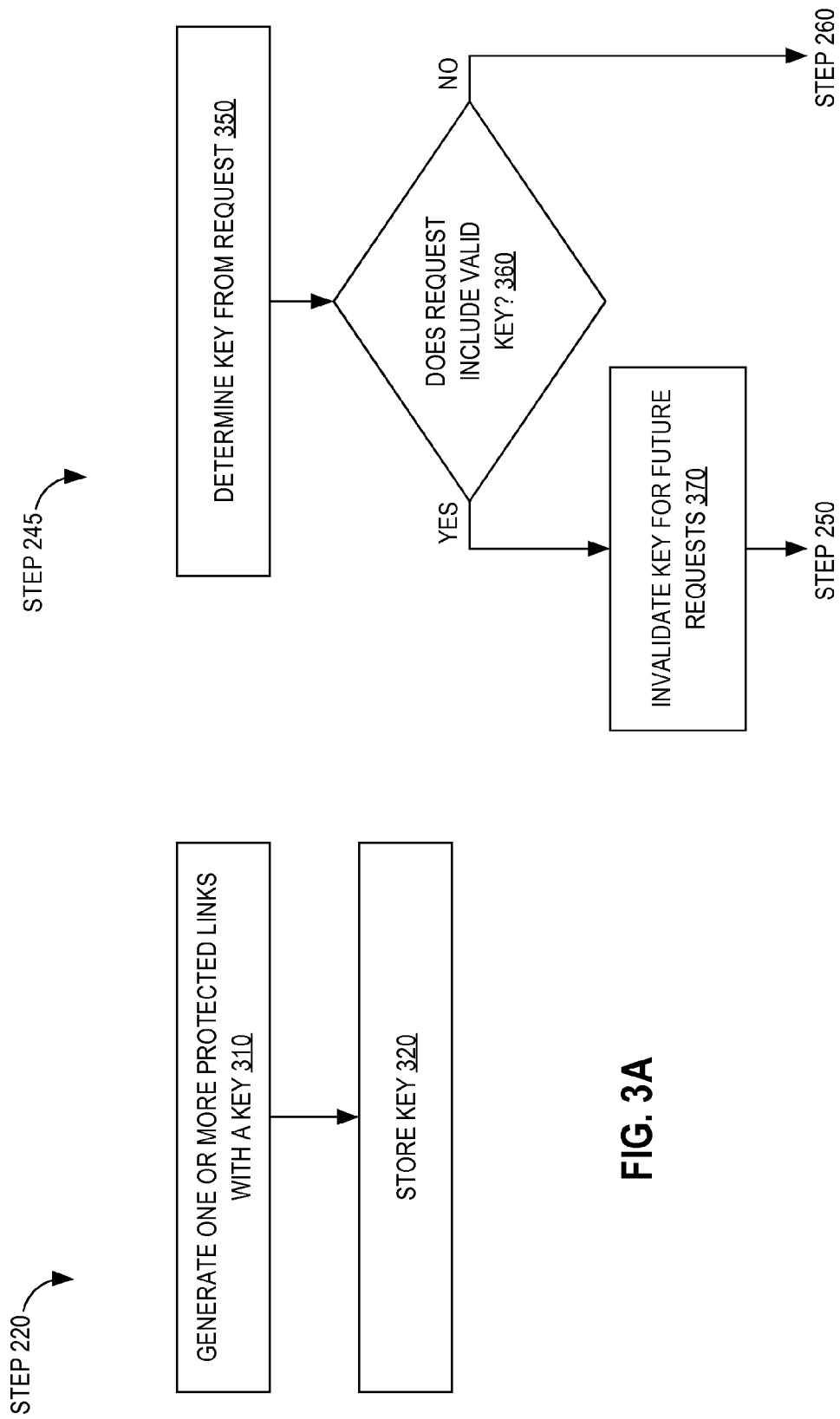
FIG. 3A illustrates a process for generating a protected link using a state-based intermediary, in an example embodiment.
FIG. 3B illustrates a process for determining whether a request is valid using a state-based intermediary computer in an example embodiment.

FIG. 3A illustrates a process for generating a protected link using a state-based intermediary, in an example embodiment. In step 310, the intermediary generates one or more protected links with a key embedded in each link. For example, intermediary computer 130 may generate a new unique key. Intermediary computer 130 may generate a new link with the new unique key.

A new unique key may be generated each time the particular source page is requested. Thus, even if a browser 195 requests the same page twice, browser 195 need not receive the same link with the same key twice. Bots that rely on finding a particular link may be unable to find the desired link since intermediary computer 130 may generate a new unique key each time the particular source page is requested.

A key may be used more than once. The key may be encrypted using an initialization vector. In an embodiment, a key may be encrypted with a new initialization vector each time the particular source page is requested. Thus, the key need not be a new unique key each time, but because the key is encrypted with a new initialization vector, the encrypted key may appear to be different each time the particular source page is requested.

In step 320, the intermediary may store the key. For example, intermediary computer 130 may store the key in data storage 140 to be used to validate a subsequent request with the key.

Intermediary computer 130 may generate and store additional data associated with the key to validate a subsequent request with the key. For example, intermediary computer 130 may store a reference to the source page that will contain the link with the new key. Additionally or alternatively, intermediary computer 130 may store a user name, Internet Protocol ("IP") address and/or Media Access Control ("MAC") address associated with the client computer that the link will be sent to. Additionally or alternatively, intermediary computer 130 may store data that indicates a time the key was generated and/or a time at which the key should expire.

Additionally or alternatively, a link may be a key. For example, based on one or more polymorphic protocols, intermediary computer 130 may generate a new link that corresponds to a particular link that should be protected. The new link may include a new target page reference. The new target page reference may appear to be a reference to a new, random, and/or different target page. However, the new target page reference may be the key. Intermediary computer 130 may store a mapping between the new target page reference and the original link's target page.

3.1.2 Generating a Protected Link Using a Stateless Intermediary

Figure 4:
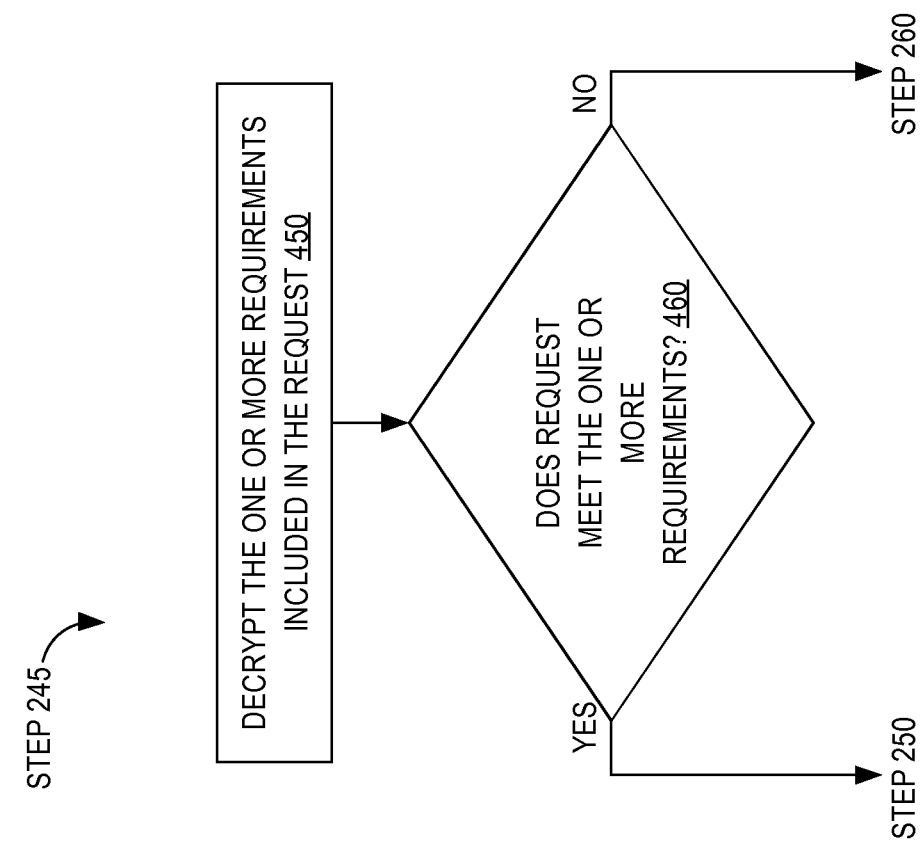
FIG. 4A illustrates a process for generating a protected link using a stateless intermediary, in an example embodiment.
FIG. 4B illustrates a process for determining whether a request is valid using a stateless intermediary computer in an example embodiment.

FIG. 4A illustrates a process for generating a protected link using a stateless intermediary, in an example embodiment. In step 410, the intermediary generates one or more protected links with an encrypted set of one or more values. The encrypted set of one or more values may be referred to herein as an opaque blob because the values are opaque to a client computer that receives them, which is not intended to modify the values during ordinary operation, and because the values may be carried in a data segment of arbitrary length. For example, intermediary computer 130 may generate a set of one or more encrypted values that may be used to validate a subsequent request that includes the encrypted values.

The one or more values may include, among other things, one or more of the factors associated with a key in step 320. For example, the opaque blob may include a reference to the source page that will contain the link. Additionally or alternatively, the opaque blob may include a user name, Internet Protocol ("IP") address and/or Media Access Control ("MAC") address associated with the client computer that the link will be sent to. Additionally or alternatively, the opaque blob may include data that indicates a time the link was generated and/or a time at which the link should expire.

Changing the opaque blob may invalidate the encryption. If a client computer changes the encrypted one or more values and includes the changed one or more values in a request, then intermediary computer 130 may be unable to decrypt the values. Thus, intermediary computer 130 may be unable to validate a request with an opaque blob that has been changed by a client computer.

An intermediary computer may generate a protected link using one or more methods discussed herein. For example, intermediary computer 130 may generate a link that has a key stored in data storage 140, as discussed with a state-based intermediary, and an opaque blob, as discussed with a stateless intermediary. In an embodiment, the encrypted blob may also be a key stored in data storage 140. In an embodiment, the encrypted blob may include a key stored in data storage 140.

3.2 Generating a Decoy Link

Returning to FIG. 2, in step 225, the intermediary computer generates one or more decoy links. For example, intermediary computer 130 may generate a decoy link with a bad key and/or an invalid opaque blob. Additionally or alternatively, intermediary computer 130 may generate a decoy link without a key and/or opaque blob. Additionally or alternatively, intermediary computer 130 may generate a decoy link that includes a key in data storage 140, but is associated with data, and/or is included in a data structure, indicating that the key corresponds with a decoy link. Additionally or alternatively, intermediary computer 130 may generate a decoy link that includes an opaque blob with data, and/or a data structure, indicating that the link is a decoy link.

Intermediary computer 130 may generate one or more decoy links that corresponds with one or more protected links. For example, a particular decoy link that corresponds with a particular protected link may include the same reference to the target page as the particular protected link. Intermediary computer 130 need not generate a decoy link that corresponds with a public link. For example, if a link to a help page is designated as public, then intermediary computer 130 need not create a decoy link that corresponds to, and/or is near, the help link, which may otherwise distract bots or search engines from requesting the target help page. Additionally or alternatively, intermediary computer 130 may generate one or more decoy links that do not correspond to any particular protected link.

Intermediary computer 130 may generate one or more decoy data structures that contain and/or reference decoy links. A decoy data structure may include one or more divisions, sections, images, blocks, text, paragraphs, and/or any other data or structures. The data in a decoy data structure and/or decoy link may be random, nonsensical, and/or other data not intended to be rendered on a display for a legitimate user to see. A decoy data structure may be part of, and/or comprise, a hierarchy objects.

More than one decoy link may be generated for each protected link. For example, to decrease the chance of a bot selecting a valid protected link, intermediary computer 130 may generate more than one decoy link that is near, and/or corresponds to, a valid protected link. Providing additional decoy links may cause a bot to traverse decoy paths created by decoy links, decoy data structures, and/or decoy pages instead of receiving data and/or pages intended for legitimate users to see. Causing a bot to traverse a decoy path may be referred to as a reverse denial of service attack, because a bot may be effectively prevented from finding data and/or pages intended for legitimate users to see while spending a substantial amount of time traversing a decoy path. Furthermore, intermediary computer 130 may relieve web infrastructure 105 from providing service to clients with requests based on decoy links.

3.3 Rendering and Sending a Second Set of Instructions to the Client

In step 230, the intermediary computer renders a second set of instructions comprising the one or more protected links and the one or more decoy links, and which when executed on a first client computer, causes the client computer to present the one or more protected links in the user interface, and hide the one or more decoy links and/or data structures from the user interface. Since a user typically relies on visual renderings of links and/or data structures, a user need not be distracted with, and/or select a decoy link or decoy data structure. The second set of instructions need not comprise the one or more links determined to be protected, and for which the protected links were generated to replace. For example, intermediary computer 130 may render modified HTML, JavaScript, and CSS 190, which include the protected link(s), decoy link(s), and/or decoy data structure(s) discussed above.

In step 235, the intermediary computer sends the second set of instructions to the client computer. For example, intermediary computer 130 sends modified HTML, JavaScript, and CSS 190 to browser 195.

3.4 Determining Whether a Request for a Target Page is Valid

In step 240, the intermediary computer receives a request. For example, a user using browser 195 may select a link that references a particular target page. In response, browser 195 may generate a request for the target page based on the selected link. Also for example, browser 195 may be a bot configured to crawl one or more web sites. Browser 195 may generate a request for a target page based on a link selected by browser 195. In either example, intermediary computer receives the request from client computer 199, which browser 195 is executed by.

In step 245, the intermediary computer determines whether the request for the target page is based on a decoy link. Additionally or alternatively, the intermediary computer may determine whether the request for the target page was based on a protected link and whether the protected link was valid or invalid. Additionally or alternatively, the intermediary computer may determine whether the request is based on a public link, or is for a target page that is deemed to be public, and/or not deemed to be protected by configuration 132.

3.4.1 Determining Whether a Request is Valid Using a State-Based Intermediary

FIG. 3B illustrates a process for determining whether a request is valid using a state-based intermediary computer in an example embodiment. In step 350, the intermediary computer determines the key from the request. For purposes of illustrating a clear example, assume that intermediary computer 130 receives a request for a target page that includes a parameter that corresponds to a key, the "key" parameter. Intermediary computer 130 may extract the key from the request accordingly. Additionally or alternatively, the key parameter may be embedded in the path of the target URL. Additionally or alternatively, the key parameter may be appended to the path of the target page. Additionally or alternatively, the parameter need not be labeled "key", and the parameter need not be included in the URL of the target page. For example, the key may be included in the payload of a HTTP Post request, a TCP/IP packet, and/or any other standard or proprietary protocol.

In step 360, the intermediary computer determines whether the key is valid. For example, intermediary computer 130 may query for the key in data storage 140. If the key is found, then intermediary computer 130 may determine that the key, and thus the request, is valid and proceed to step 370. Otherwise, intermediary computer 130 may determine the key, and thus the request, is invalid and proceed to step 260.

Additionally or alternatively, the key may be associated with a source page. If the request identifies the source page and the referral page, then intermediary computer 130 may determine that the key, and thus the request, is valid and proceed to step 370. Otherwise, intermediary computer 130 may determine the key, and thus the request, is invalid and proceed to step 260.

Additionally or alternatively, the key may be associated with a target page. If the request is for the target page, then intermediary computer 130 may determine that the key, and thus the request, is valid and proceed to step 370. Otherwise, intermediary computer 130 may determine the key, and thus the request, is invalid and proceed to step 260.

Additionally or alternatively, the key may be associated with a Boolean value or flag value. If intermediary computer 130 determines that the Boolean value is set to true, then intermediary computer 130 may determine that the key, and thus the request, is valid and proceed to step 370. Otherwise, intermediary computer 130 may determine the key, and thus the request, is invalid and proceed to step 260.

Additionally or alternatively, the key may be associated with a user identifier, such as a user name. If intermediary computer 130 determines that the request includes the user identifier then intermediary computer 130 may determine that the key, and thus the request, is valid and proceed to step 370. Otherwise, intermediary computer 130 may determine the key, and thus the request, is invalid and proceed to step 260.

Additionally or alternatively, the key may be associated with an IP address and/or MAC address. If intermediary computer 130 determines the request was received from the same IP address and/or MAC address, then intermediary computer 130 may determine that the key, and thus the request, is valid and proceed to step 370. Otherwise, intermediary computer 130 may determine the key, and thus the request, is invalid and proceed to step 260.

Additionally or alternatively, the key may be associated with a time at which the key was created, a time at which the key become invalid, and/or an interval over which the key is valid. If intermediary computer 130 determines that the request was made within the time period that the key was valid for, then intermediary computer 130 may determine that the key, and thus the request, is valid and proceed to step 370. Otherwise, intermediary computer 130 may determine the key, and thus the request, is invalid and proceed to step 260.

Additionally or alternatively, if a request does not include a key, then intermediary computer 130 may query configuration 132 for the target page in the request. If the target page is designated as public and/or is not designated as protected according to configuration 132, then intermediary computer 130 may determine the request is valid and proceed to step 250.

In step 370, the intermediary computer invalidates they key for future requests. For example, intermediary computer 130 may delete the key from data storage 140. Additionally or alternatively, if additional data is associated with the key in data storage 140, then intermediary computer 130 may update the data to invalidate the key for subsequent requests. For example, intermediary computer 130 may set an associated Boolean value to false, delete one or more associated user identifiers, IP addresses, MAC addresses, references to source pages and/or a target pages, times, and/or intervals.

In an embodiment, intermediary computer 130 need not invalidate the key. For example, if the key is associated with a particular time, then intermediary computer 130 may validate one or more requests that are received on and/or before the particular time, and proceed to step 250. Additionally or alternatively, intermediary computer 130 may proceed to step 260 for each request received on and/or after the particular time.

Some keys may be valid indefinitely. For example, a key may be invalid until an administrator, through administration interface 170, removes and/or invalidates the key in data storage 140.

3.4.2 Determining Whether a Request is Valid Using a Stateless Intermediary

FIG. 4B illustrates a process for determining whether a request is valid using a stateless intermediary computer in an example embodiment. In step 450, the intermediary computer decrypts the one or more requirements included in the request. For purposes of illustrating a clear example, assume that intermediary computer 130 receives a request for a target page that includes an opaque blob of the type described above with one or more requirements, such as a source page reference, target page reference, user identifier, IP address, MAC address, time, and/or any other factor discussed herein. Intermediary computer 130 may decrypt the opaque and each of the one or more requirements.

If a request does not include an opaque blob, then intermediary computer 130 may query configuration 132 to identify the target page in the request. If the target page is not protected according to configuration 132, then intermediary computer 130 may proceed to step 250.

In step 460, the intermediary computer may determine whether the request meets the one or more requirements. For example, intermediary computer 130 may verify that each requirement in the opaque blob received in step 450 is satisfied. If so, then intermediary computer 130 may determine that the request is valid and proceed to step 250. Otherwise, intermediary computer 130 may proceed to step 260.

3.5 Responding to the Request

Returning to FIG. 2, in step 250, the intermediary computer generates and/or sends the target page to the client computer. For example, intermediary computer 130 may forward the request received in step 240 to web infrastructure 105. In response, intermediary computer 130 may receive the target page from web infrastructure 105. Intermediary computer 130 may repeat steps 210 through 235 to produce a modified target page, and send the modified target page with protected and/or decoy links to browser 195. In an embodiment, if the target page is designated as public in configuration 132, then intermediary computer 130 need not insert decoy links and/or decoy structures.

In step 260, the intermediary computer generates and sends a decoy page with one or more decoy links to the client computer. For example, intermediary computer 130 may generate a new decoy page that includes one or more decoy data structures and/or decoy links.

Intermediary computer 130 may include, in a decoy page, some data and/or data structures from a target page that a legitimate user is intended to see. For example, intermediary computer 130 may request the target page from web infrastructure 105. In response, intermediary computer 130 may receive the target page. Intermediary computer 130 may strip out sensitive data designated as such in the target page, as defined in configuration 132, data storage 140, and/or by web infrastructure 105. Intermediary computer 130 may replace the sensitive data with one or more decoy link and/or decoy structures. Additionally or alternatively, intermediary computer 130 may insert one or more decoy links and/or decoy data structures throughout the decoy page.

The intermediary computer need not send any page and/or data in response to a request determined to be based on a decoy link. For example, in step 260, intermediary computer 130 may do nothing. Additionally or alternatively, an administrator, through administration interface 170 and/or administrator computer 150, may configure intermediary computer 130 to respond with a particular error. The error may include one or more codes, such as an HTTP error code. The error may include text indicating there was an error and/or text describing the error.

An administrator may configure the intermediary computer to respond to a request based on a particular invalid link and/or a particular decoy link. For example, an administrator, through administration interface 170 and/or administrator computer 150, may configure intermediary computer 130 to give a particular response if a request is based on an invalid link and/or decoy link that corresponds to a particular protected link and/or is associated with a particular source page and/or target page. Additionally or alternatively, the administrator may configure intermediary computer to respond to an invalid link and/or decoy link by forwarding the user to a particular web page, such as an error page.

The intermediary computer may respond to invalid and/or decoy links randomly. For example, in response to receiving a first request based on an invalid link and/or a decoy link from a client computer, intermediary computer 130 may send HTTP error code 500 to the client computer. In response to receiving a second request based on an invalid link and/or a decoy link from a client computer, intermediary computer 130 may send, to the client computer, human-readable text indicating to the user that the link which the request is based on is no longer valid. In response to receiving a third request based on an invalid link and/or a decoy link from a client computer, intermediary computer 130 need not send any data to the client computer. In response to receiving a fourth request from a client computer based on an invalid link and/or a decoy link, intermediary computer 130 may send a decoy page to the client computer.

3.6 Including Additional Decoy Links or Decoy Data Structures

Intermediary computer 130 may embed data in a page and/or a decoy link to determine whether to increase the number of decoy links and/or decoy data structures in a page. For example, intermediary computer 130 may insert a first decoy link in a first page with the number "1" embedded in the link. If intermediary computer 130 receives a subsequent request based on the first decoy link, then intermediary computer 130 may insert a second decoy link in a first decoy page with the number "2" embedded in the link. If intermediary computer 130 receives a subsequent request based on the second decoy link, then intermediary computer 130 may insert a third decoy link in a second decoy page with the number "3" embedded in the link. As intermediary computer 130 receives requests based on decoy links with higher embedded numbers, intermediary computer may increase the number of decoy links in the next generated decoy page. Thus, a bot traversing decoy pages may find more and more decoy links to follow which may cause a better reverse denial of service attack.

Intermediary computer 130 may store features about a browser and/or computer that makes a request based on a decoy link. For example, intermediary computer 130 may store a one or more browser identifiers, user identifiers, IP addresses, MAC addresses, and/or any other data received and/or derived from a request based on a decoy link. When intermediary computer 130 receives a request that matches one of the stored factors, then intermediary computer 130 may respond to an apparently valid request with a valid page that has more decoy links and/or decoy data structures that intermediary computer 130 would otherwise include.

3.7 Building a Site Map and Selecting Links to Protect

Figure 5:
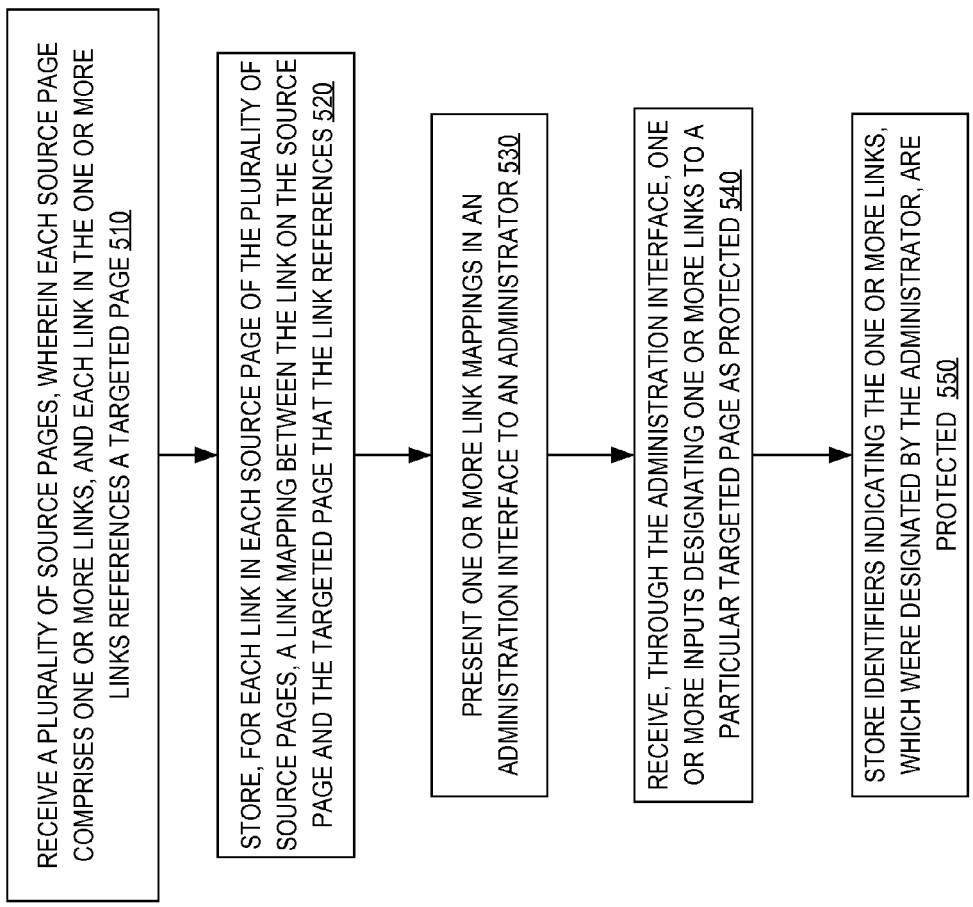
FIG. 5 illustrates a process for building a site map and selecting links for an intermediary computer to protect, in an example embodiment.

FIG. 5 illustrates a process for building a site map and selecting links for an intermediary computer to protect, in an example embodiment. In step 510, the intermediary computer receives a plurality of source pages, wherein each source page comprises one or more links that reference one or more targeted pages. For example, intermediary computer 130 may receive one or more requests for one or more target pages from one or more client computers. Intermediary computer 130 may forward the request(s) to web infrastructure 105, and in response, intermediary computer may receive the page(s) from web infrastructure 105.

In step 520, the intermediary computer stores, for each link in each source page of the plurality of source pages, a link mapping between the link on the source page and the targeted page that the link references. For example, in response to the one or more requests in step 510, intermediary computer 130 may traverse each page received. For each link in each page, intermediary computer 130 may store a link mapping in data storage 140. Each link mapping may include a link identifier, source page identifier, and/or target page identifier. A link identifier may be a name, number, alpha-numeric string, XPath in a source page, type identifier, class identifier, division or section identifier, source page identifier (such as a URL and/or path of the source page), target page identifier (such as a URL and/or path of the target page), and/or any other identifier.

A link mapping may represent a one or more links. For example, a single link mapping may represent two links on the same source page that both reference the same target page.

In step 530, an administrator computer may present one or more link link mappings in an administration interface to an administrator. For example, administrator computer 150 may query data storage 140 for link mappings from one or more source pages to one or more target pages. Administrator computer 150 may render the queried link mappings through administration interface 170.

Administration interface 170 may render a graph wherein the nodes in the graph represent source and target pages, and the edges in the graph represent link mappings between source pages and target pages. Additionally or alternatively, administration interface 170 may show a list of link mappings, each of which represent one or more links in a source page. Administration interface 170 may also indicate the target page of each link. Additionally or alternatively, administration interface 170 may show a list of link mappings, each of which represent one or more links to a target page. Administration interface 170 may also indicate the source page of each link.

In step 540, the administrator computer receives, through the administration interface, one or more inputs designating one or more links to a particular target page as protected. For example, administrator computer 150 may receive input through administration interface 170 indicating that a user selected one or more link mappings that should be protected. Additionally or alternatively, administrator computer 150 may receive input through administration interface 170 indicating that a user selected one or more target pages, wherein each link that refers to the one or more target pages, regardless of each link's source page, should be protected. Additionally or alternatively, administrator computer 150 may receive input through administration interface 170 indicating that a user selected one or more source pages, wherein each link that is included in the source page, regardless of each link's target page, should be protected.

The administrator computer 150 may receive input through administration interface 170 indicating that a user selected one or more link mappings, source pages, and/or target pages for which the corresponding links should be public. Additionally or alternatively, administrator computer 150 may receive input through administration interface 170 indicating that a user selected one or more particular links that should be public.

In step 550, the administrator computer stores one or more identifiers, which indicate which links were designated by the administrator as protected. For example, administrator computer 150 may store the identifier for each selected link in configuration 132. Administrator computer 150 may remove and/or toggle identifiers of links that are no longer selected. A link identifier may identify one or more links, target pages, and/or source pages.

3.7.1 Routing a Request from a First Link to a Second Link

An administrator computer may receive, through the administration interface, one or more inputs routing a first a link mapping to a second link mapping. For example, administrator computer 150 may receive input through administration interface 170 indicating that a user selected a first link mapping and a second link mapping. The first link mapping may correspond to a first link in a first source page that references a first target page. The second link mapping may correspond to a second link in a second source page that references a second target page. The input may include instructions to route requests based on the first link to the second link. Administrator computer 150 may update configuration 132 accordingly. In response to determining that a request is based on the first link and the corresponding first link mapping is routed to the second link mapping, intermediary computer 130 may route the client computer to the second target page by requesting the second target page from web infrastructure 105.

Intermediary computer 130 may treat a request based on the first link as public or protected, based on whether the second link is designated as public or protected. For example, if the second link mapping discussed above is protected, then a request based on the first link may be treated as if the first link is protected, regardless of whether the first link and/or the corresponding first link mapping is designated as public or protected. Also for example, if the second link references a second target page that is protected and the first link is routed to the second link, then a request based on the first link may be treated as if the first link is protected, regardless of whether the first link and/or the corresponding first link mapping is designated as public or protected. Alternatively, intermediary computer 130 may treat a request based on the first link as public or protected as indicated in configuration 132, regardless whether the second link mapping, the second link, second source page, and/or second target page is designated as public or protected.

3.7.2 Setting Default Behaviors

An administrator computer may receive input that defines one or more default behaviors. For example, administrator computer 150 may receive, through administration interface 170, input indicating that if intermediary computer 130 cannot determine whether the request is based on a link that is defined as public or protected, then intermediary computer 130 should respond to the request as if the request is based on a decoy link. Administrator computer 150 may update configuration 132 accordingly.

Intermediary computer 130 may not be able to determine whether the request is based on a link that is defined as public or protected because the request is based on a link that does not have a corresponding link mapping. Additionally or alternatively, intermediary computer 130 may not be able to determine whether the request is based on a link that is defined as public or protected because the link identifier is not stored in configuration 132.

As another example of a user defining a default behavior, administrator computer 150 may receive input indicating that if intermediary computer 130 determines a request is based on a link that has a corresponding link mapping, but is not expressly defined as public or protected, then intermediary computer 130 should respond to the request as if the request is based on a public link. Administrator computer 150 may update configuration 132 accordingly.

3.7.3 Deleting Link Mappings

An administrator computer may receive, through the administration interface, one or more inputs selecting one or more link mappings and instructing the administrator computer to delete the one or more link mappings. In response, the administrator computer may delete data related to the one or more link mappings in data storage 140 and/or configuration 132. Additionally or alternatively, if intermediary computer 130 receives a page and determines that a particular link is no longer in the page, then intermediary computer 130 may delete data related to the link in data storage 140 and/or configuration 132. Additionally or alternatively, if intermediary computer 130 receives a page that no longer has one or more particular links, then intermediary computer 130 may delete the corresponding link mapping(s) in data storage 140.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Other Aspects of Disclosure

Using the networked computer arrangements, intermediary computer, and/or processing methods described herein, security in client-server data processing may be significantly increased. In particular, the use of browser programs may become significantly more secure. Employing one or more of the techniques discussed herein may effectively permit obfuscating data field and/or container identifiers and DOM modification for data that is financial, personal, or otherwise sensitive so that attackers cannot determine which fields and/or containers in a web page include the sensitive data. Consequently, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities, are frustrated because all fields and/or containers appear to the attacker to be gibberish, or at least cannot be identified as indicating credit card data, bank account numbers, personally identifying information, confidential data, sensitive data, proprietary data, and/or other data.

Using the networked computer arrangements, intermediary computer, and/or processing methods described herein, valid protected links and public links may be visible to a user using a browser. However, decoy links need not be visible to the user. For example, the intermediary may include one or more instructions in a web page, which causes a browser to hide decoy links. Thus, a user using a browser may be unable (or not as likely) to select a decoy link. The remaining visible links from which a user may select may be either public links or protected links that are associated with a valid key.

In contrast, bots, which merely parse the instructions and data structures, do not execute theses instructions. Bots are merely looking to gather and/or submit data quickly. Bots do not try to determine which links a user would be able to select if using a full browser. Thus, a bot may select decoy links. Since users using a browser cannot select decoy links, only bots are likely select decoy links.

An invalid link may be a protected link that was, but is no longer, associated with a valid key. Users may be unlikely to select invalid links, but bots may be much more likely. For purposes of illustrating a clear example, assume a protected link is generated for a particular web page, the protected link is associated with a key, the key is associated with a parameter indicating a page from which the link is valid (a source page), both a browser and a bot request the particular web page, and a browser used by a user is configured to send HTTP requests that indicate a source page: the web page the user last saw and/or which the link was selected from. A user using a browser may select the link, which causes the browser to submit a request with data indicating the source page from which the link was selected (the particular web page). The intermediary may validate the HTTP request based on the data indicating that the source page was the particular page. However, a bot may generate a request based on the same link but not specify the source page. Accordingly, the intermediary may determine that the request is invalid.

For purposes of illustrating another clear example, assume a protected link is generated for a particular web page, the protected link is associated with a key, the key is associated with a parameter indicating a particular time at which the link is no longer valid, the particular web page includes many other links, and both a browser and a bot request the particular web page. A user may select the protected link, and the browser may generate a request based on the selected link before the particular time period through the normal course of browsing the particular web page. The intermediary will validate the request accordingly. In contrast, a bot, may select many other links, and traverse many other pages, before requesting a web page based on the protected link. Thus, the bot may generate a request based on the protected link after the particular time. Accordingly, the intermediary need not validate the bot's request.

The instructions that may be rendered by the intermediary need not force a bot to only select decoy links and/or invalid links. Indeed, a bot may select one or more valid links. If a bot does select a public and/or valid protected link, then the bot may receive the same valid page as a user using a browser. However, sooner or later, a bot may either select a decoy link or an invalid link, or generate a request that does not have the requisite data for the intermediary to validate the request. Accordingly, the intermediary may send the bot a decoy page, which may include many more decoy links that would not be visible to a user if the user inadvertently selected a decoy link or invalid link. The bot, however, may continue to select decoy links and receive decoy pages, causing the bot to get lost in a never ending series of decoy pages.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   intercepting, using a server computer, a first set of instructions that define a user interface and a plurality of links, wherein each link in the plurality of links is associated with a target page, and the plurality of links includes a first link;
   determining that the first link, which references a first target page, is protected;
   in response to determining the first link is protected, generating, for the first link, a first protected link and a first decoy link that corresponds to the first protected link;
   wherein the first protected link is different than the first link and includes first data that authenticates a first request that has been generated based on the first protected link and that references the first target page;

wherein the first decoy link includes second data that references a first decoy page and not the first target page, wherein the first decoy page includes false information;

rendering a second set of instructions comprising the first protected link and the first decoy link, but not the first link, and which is configured to cause a first client computer to present the first protected link in the user interface and hide the first decoy link from the user interface;

sending the second set of instructions to the first client computer;

wherein the method is performed by one or more computing devices.

2. The method of claim 1 further comprising:

intercepting, from the server computer, a third set of instructions that defines the first link;

determining that the first link defined in the third set of instructions is protected;

in response to determining the first link is protected:

generating a second protected link, wherein the second protected link is different than the first link and the first protected link, and includes third data that authenticates a second request that has been generated based on the second protected link; and generating a second decoy link that includes data that references a second decoy page and not the first target page;

rendering a fourth set of instructions comprising the second protected link and the second decoy link, but neither the first link nor the first protected link, and which is configured to cause the first client computer to present the second protected link in the user interface; and hide the second decoy link from the user interface;

sending the fourth set of instructions to the first client computer.

3. The method of claim 1 further comprising:

determining that a second link in the plurality of links is not protected;

in response to determining the second link is not protected, the step of rendering the second set of instructions comprises rendering one or more instructions that define the second link.

4. The method of claim 1 further comprising:

receiving, from the first client computer, a second request indicating that the first decoy link was selected;

in response to determining the first decoy link was selected, generating a decoy page with one or more decoy links, which when selected generate an additional request for an additional decoy page with one or more additional decoy links;

sending, to the first client computer, the decoy page.

5. The method of claim 1, wherein the first protected link includes a key, and the method further comprising:

storing the key indicating that the key is valid;

receiving, from the first client computer, the first request with the key indicating the first protected link was selected;

determining the key is valid;

in response to determining the key is valid, sending a second request to the server computer for a set of valid data to generate the first target page;

generating the first target page with the set of valid data;

sending the first target page to the first client computer.

6. The method of claim 5 further comprising:

invalidating the key;

receiving, from a second client computer, a third request with the key;

determining that the key is invalid;

in response to determining that the key is invalid, generating a decoy page with one or more decoy links that are configured to cause generating an additional request for an additional decoy page with one or more additional decoy links;

sending, to the second client computer, the decoy page.

7. The method of claim 6, wherein the first client computer and the second client computer are a single computer.

8. The method of claim 1, wherein the first protected link includes a key that is valid for an interim time, and the method further comprising:

storing a mapping between the key and the interim time;

receiving, from the first client computer, the first request with the key for the first target page at a particular time;

determining that the key is valid when the particular time is less than or equal to the interim time;

in response to determining that the key is valid, sending a second request to the server computer for a set of valid data to generate the first target page;

generating the first target page with the set of valid data;

sending the first target page to the first client computer.

9. The method of claim 1, wherein the first protected link includes a key that is valid for an interim time, and the method further comprising:

storing a mapping between the key and the interim time;

receiving, from the first client computer, a second request with the key for the first target page at a particular time;

determining that the key is invalid when the particular time is greater than the interim time;

in response to determining that the key is invalid, generating a decoy page with one or more decoy links that are configured to cause generating an additional request for an additional decoy page with one or more additional decoy links;

sending the decoy page to the first client computer.

10. The method of claim 1 further comprising:

encrypting one or more requirements to produce an encrypted set of requirements, which identify a particular page from which the first protected link is valid, wherein the first protected link includes the encrypted set of requirements;

receiving, from the first client computer, the first request with the encrypted set of requirements and identifying a previous page from which the first link was selected;

decrypting the encrypted set of requirements;

determining the particular page is the previous page;

in response to determining the particular page is the previous page, sending a second request to the server computer for a set of valid data to generate the first target page;

generating the first target page with the set of valid data;

sending the first target page to the first client computer.

11. The method of claim 1 further comprising:

encrypting one or more requirements to produce an encrypted set of requirements, which identify a particular page from which the first protected link is valid, wherein the first protected link includes the encrypted set of requirements;

receiving, from the first client computer, a decoy request with the encrypted set of requirements and identifying a previous page from which the first link was selected;

decrypting the encrypted set of requirements;

determining the particular page is not the previous page;

in response to determining the particular page is not the previous page, generating a decoy page with one or more decoy links, which when selected generate an additional request for an additional decoy page with one or more additional decoy links;
sending, to the first client computer, the decoy page.

12. The method of claim 1 further comprising:
encrypting one or more requirements to produce an encrypted set of requirements, which identify a particular page from which the first protected link is valid and a particular time, wherein the first protected link includes the encrypted set of requirements;
receiving, from the first client computer, the first request at a first time with the encrypted set of requirements identifying a previous page from which the first link was selected;
decrypting the encrypted set of requirements;
determining the particular page is the previous page;
determining the first time is less than or equal to the particular time;
in response to determining the particular page is the previous page and the first time is less than or equal to the particular time, sending a second request to the server computer for a set of valid data to generate the first target page;
generating the first target page with the set of valid data;
sending the first target page to the first client computer.

13. The method of claim 1 further comprising:
encrypting one or more requirements to produce an encrypted set of requirements, which identify an interim time, wherein the first protected link includes the encrypted set of requirements;
receiving, from the first client computer, a decoy request at a particular time with the encrypted set of requirements, indicating the first link was selected;
decrypting the encrypted set of requirements;
determining the particular time is greater than the interim time;
in response to determining the particular time is greater than the interim time, generating a decoy page with one or more decoy links, which are configured to cause generating an additional request for an additional decoy page with one or more additional decoy links;
sending the decoy page to the first client computer.

14. The method of claim 1 further comprising:
receiving a plurality of source pages, wherein each source page comprises a set of instructions, each set of instructions includes one or more links, and each link in the one or more links references a targeted page;
storing, for each link in each source page of the plurality of source pages, a link mapping between the link on the source page and the targeted page that the link references;
presenting one or more link mappings in an administration interface to an administrator;
receiving, through the administration interface, one or more inputs designating a particular link from a particular source page to a particular targeted page as protected, wherein the particular link has a particular link identifier;
determining a first link identifier for the first link;
determining the first link is protected by determining that the first link identifier matches the particular link identifier.

15. The method of claim 1 further comprising:
receiving, through an administration interface, one or more inputs associating the first link and a second link, wherein the first link references a first targeted page and the second link references a second target page;
routing the first link with the second link;
receiving the first request based on the first link;
determining that the first link is routed to the second link;
sending a second request to the server computer for a set of valid data to generate the second target page;
generating the second target page with the set of valid data;
sending the second target page to the first client computer.

16. A computer system comprising:
a processor;
a memory;
a processing module configured to:
intercept, from a server computer, a first set of instructions that define a user interface and a plurality of links, wherein each link in the plurality of links is associated with a target page, and the plurality of links includes a first link;
determine that the first link, which references a first target page, is protected;
in response to determining the first link is protected, generating, for the first link, a first protected link and a first decoy link that corresponds to the first protected link;
wherein the first protected link is different than the first link and includes first data that authenticates a first request that has been generated based on the first protected link and that references the first target page;
wherein the first decoy link that includes second data that references a first decoy page and not the first target page, wherein the first decoy page includes false information;
render a second set of instructions comprising the first protected link and the first decoy link, but not the first link, and which is configured to cause a first client computer to present the first protected link in the user interface and hide the first decoy link from the user interface;
send the second set of instructions to the first client computer.

17. The computer system of claim 16, wherein the processing module is further configured to:
intercept a third set of instructions that defines the first link;
determine that the first link defined in the third set of instructions is protected;
in response to determining the first link is protected:
generate a second protected link, wherein the second protected link is different than the first link and the first protected link, and includes third data that authenticates a second request that has been generated based on the second protected link and that references the first target page; and
generate a second decoy link that includes data that references a second decoy page and not the first target page;
render a fourth set of instructions comprising the second protected link and the second decoy link, but neither the first link nor the first protected link, and which is configured to cause the first client computer to present the second protected link in the user interface; and hide the second decoy link from the user interface;
send the fourth set of instructions to the first client computer.

18. The computer system of claim 16, wherein the processing module is further configured to:
determine that a second link in the plurality of links is not protected;
in response to determining the second link is not protected, render one or more instructions that define the second link in the second set of instructions.

19. The computer system of claim 16, wherein the processing module is further configured to:
- receive, from the first client computer, a second request indicating that the first decoy link was selected;
- determine that the second request is based on the first decoy link;
- in response to determining that the second request is based on the first decoy link, generate a decoy page with one or more decoy links, which when selected generate an additional request for an additional decoy page with one or more additional decoy links;
- send, to the first client computer, the decoy page.

20. The computer system of claim 16 comprising a storage, wherein the first protected link includes a key and the processing module is further configured to:
- store, in the storage, the key indicating that the key is valid;
- receive, from the first client computer, the first request with the key indicating the first protected link was selected;
- determine the key is valid based, at least in part, on finding the key in the storage;
- in response to determining the key is valid, send a second request to the server computer for a set of valid data to generate the first target page;
- generate the first target page with the set of valid data;
- send the first target page to the first client computer.

21. The computer system of claim 20, wherein the processing module is further configured to:
- invalidate the key;
- receive, from a second client computer, a third request with the key;
- determine that the key is invalid;
- in response to determining that the key is invalid, generate a decoy page with one or more decoy links that are configured to cause generating an additional request for an additional decoy page with one or more additional decoy links;
- send, to the second client computer, the decoy page.

22. The computer system of claim 21, wherein the first client computer and the second client computer are a single computer.

23. The computer system of claim 16 comprising a storage, wherein the first protected link includes a key that is valid for an interim time and the processing module is further configured to:
- store, in the storage, a mapping between the key and the interim time;
- receive, from the first client computer, the first request with the key for the first target page at a particular time;
- retrieve the mapping from the storage;
- determine that the key is valid when the particular time is less than or equal to the interim time;
- in response to determining that the key is valid, send a second request to the server computer for a set of valid data to generate the first target page;
- generate the first target page with the set of valid data;
- send the first target page to the first client computer.

24. The computer system of claim 16 comprising a storage, wherein the first protected link includes a key that is valid for an interim time and the processing module is further configured to:
- store, in the storage, a mapping between the key and the interim time;
- receive, from the first client computer, a second request with the key for the first target page at a particular time;
- determine that the key is invalid when the particular time is greater than the interim time based, at least in part, on the mapping in the storage;
- in response to determining that the key is invalid, generate a decoy page with one or more decoy links that are configured to cause generating an additional request for an additional decoy page with one or more additional decoy links;
- send the decoy page to the first client computer.

25. The computer system of claim 16, wherein the processing module is further configured to:
- encrypt one or more requirements to produce an encrypted set of requirements, which identify a particular page from which the first protected link is valid, wherein the first protected link includes the encrypted set of requirements;
- receive, from the first client computer, the first request with the encrypted set of requirements and identifying a previous page from which the first link was selected;
- decrypt the encrypted set of requirements;
- determine the particular page is the previous page;
- in response to determining the particular page is the previous page, send a second request to the server computer for a set of valid data to generate the first target page;
- generate the first target page with the set of valid data;
- send the first target page to the first client computer.

26. The computer system of claim 16, wherein the processing module is further configured to:
- encrypt one or more requirements to produce an encrypted set of requirements, which identify a particular page from which the first protected link is valid, wherein the first protected link includes the encrypted set of requirements;
- receive, from the first client computer, a decoy request with the encrypted set of requirements and identifying a previous page from which the first link was selected;
- decrypt the encrypted set of requirements;
- determine the particular page is not the previous page;
- in response to determining the particular page is not the previous page, generate a decoy page with one or more decoy links, which when selected generate an additional request for an additional decoy page with one or more additional decoy links;
- send, to the first client computer, the decoy page.

27. The computer system of claim 16, wherein the processing module is further configured to:
- encrypt one or more requirements to produce an encrypted set of requirements, which identify a particular page from which the first protected link is valid and a particular time, wherein the first protected link includes the encrypted set of requirements;
- receive, from the first client computer, the first request at a first time with the encrypted set of requirements identifying a previous page from which the first link was selected;
- decrypt the encrypted set of requirements;
- determine the particular page is the previous page;
- determine the first time is less than or equal to a the particular time;
- in response to determining the particular page is the previous page and the first time is less than or equal to the particular time, send a second request to the server computer for a set of valid data to generate the first target page;
- generate the first target page with the set of valid data;
- send the first target page to the first client computer.

28. The computer system of claim 16, wherein the processing module is further configured to:
- encrypt one or more requirements to produce an encrypted set of requirements, which identify an interim time, wherein the first protected link includes the encrypted set of requirements, wherein the first protected link includes the encrypted set of requirements;

receive, from the first client computer, a decoy request at a particular time with the encrypted set of requirements, indicating the first link was selected;

decrypt the encrypted set of requirements;

determine the particular time is greater than the interim time;

in response to determining the particular time is greater than the interim time, generate a decoy page with one or more decoy links, which are configured to cause generating an additional request for an additional decoy page with one or more additional decoy links;

send the decoy page to the first client computer.

29. The computer system of claim 16 further comprising:

a configuration module;

a storage;

an administrator computer configured to:

present one or more link mappings in an administration interface to an administrator;

receive, through the administration interface, one or more inputs designating a particular link from a particular source page to a particular targeted page as protected, wherein the particular link has a particular link identifier;

wherein the processing module is configured to:

receive a plurality of source pages, wherein each source page comprises a set of instructions, each set of instructions includes one or more links, and each link in the one or more links references a targeted page;

store, in the storage, for each link in each source page of the plurality of source pages, a link mapping between the link on the source page and the targeted page that the link references;

determine a first link identifier for the first link;

determine the first link is protected by determining that the first link identifier matches the particular link identifier.

30. The computer system of claim 16 further comprising:

a configuration;

an administrator computer configured to:

receive, through an administration interface, one or more inputs associating the first link and a second link, wherein the first link references a first targeted page and the second link references a second target page;

store a route from the first link with the second link in the configuration;

wherein the processing module is configured to:

receive the first request based on the first link;

determine that the first link is routed to the second link;

send a second request to the server computer for a set of valid data to generate the second target page;

generate the second target page with the set of valid data;

send the second target page to the first client computer.

* * * * *